(12) United States Patent
Gu et al.

(10) Patent No.: US 7,548,982 B2
(45) Date of Patent: Jun. 16, 2009

(54) PREDICTIVE BRANCHING AND CACHING METHOD AND APPARATUS FOR APPLICATIONS

(75) Inventors: Jun Gu, Corvallis, OR (US); John Kerr, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 527 days.

(21) Appl. No.: 10/285,231

(22) Filed: Oct. 31, 2002

(65) Prior Publication Data

US 2004/0098486 A1 May 20, 2004

(51) Int. Cl.
*G06F 15/16* (2006.01)
(52) U.S. Cl. ............................. 709/228; 709/217
(58) Field of Classification Search ................ 709/203, 709/218, 228, 224
See application file for complete search history.

(56) References Cited

U.S. PATENT DOCUMENTS

| | | | | | |
|---|---|---|---|---|---|
| 5,864,846 | A | * | 1/1999 | Voorhees et al. | 707/5 |
| 5,978,841 | A | * | 11/1999 | Berger | 709/217 |
| 6,559,861 | B1 | * | 5/2003 | Kennelly et al. | 715/703 |
| 6,578,078 | B1 | * | 6/2003 | Smith et al. | 709/224 |
| 6,633,316 | B1 | * | 10/2003 | Maddalozzo et al. | 715/854 |
| 6,757,724 | B1 | * | 6/2004 | Fields et al. | 709/223 |
| 7,013,289 | B2 | * | 3/2006 | Horn et al. | 705/26 |
| 7,194,506 | B1 | * | 3/2007 | White et al. | 709/203 |
| 2002/0069236 | A1 | * | 6/2002 | Jahnke | 709/104 |
| 2002/0152284 | A1 | * | 10/2002 | Cambray et al. | 709/218 |
| 2003/0004781 | A1 | * | 1/2003 | Mallon et al. | 705/10 |
| 2003/0014336 | A1 | * | 1/2003 | Dao et al. | 705/30 |
| 2003/0033311 | A1 | * | 2/2003 | Skinner | 707/100 |
| 2003/0101024 | A1 | * | 5/2003 | Adar et al. | 702/187 |
| 2003/0120752 | A1 | * | 6/2003 | Corcoran | 709/219 |
| 2003/0212760 | A1 | * | 11/2003 | Chen et al. | 709/218 |

FOREIGN PATENT DOCUMENTS

| | | |
|---|---|---|
| EP | 1143350 A | 10/2001 |
| GB | 2346229 | 8/2000 |

OTHER PUBLICATIONS

Wang, Zheng, "Prefetching in World Wide Web", IEEE 1996, pp. 28-32.
Cyris Shahabi et al, "Knowledge Discovery from Users Web-Page Navigation".
Replacement Policy, Chapter 11-12.

* cited by examiner

*Primary Examiner*—Patrice Winder
*Assistant Examiner*—Minh-Chau Nguyen

(57) ABSTRACT

A method and system of identifying usage patterns for web pages in a website, includes receiving a website map identifying one or more web pages in the website, tracking the web pages accessed by a user during a session, determining a branch of one or more web pages accessible by the user and corresponding to the website map, and updating a database that associates the branch with the user and indicates usage of the branch and the web pages by the user.

26 Claims, 6 Drawing Sheets

US 7,548,982 B2

PREDICTIVE BRANCHING AND CACHING METHOD AND APPARATUS FOR APPLICATIONS

CROSS REFERENCE TO RELATED APPLICATIONS

This application is related to U.S. patent application Ser. No. 10/284,891 by John M. Kerr and Jun Gu filed Oct. 31, 2002 entitled, "Method and Apparatus for Localization of Applications" assigned to the assignee of the present invention.

BACKGROUND OF THE INVENTION

Accessing web pages is becoming more difficult as applications using web pages have become larger and more complex. These applications include conventional websites, software applications with web pages, and other applications with web based user interfaces. The website presence of a typical corporation may include a public website with non-confidential corporate information, a secure internal website access with confidential and/or departmental information, an electronic commerce website for ordering, purchasing, and paying for goods or services offered by the company, and many other complex applications. In addition to their inherent complexity, these applications and interfaces are often personalized to a particular user with specific permissions and preferences. Unfortunately, limited processor power, network bandwidth, and storage latencies can make deploying large and complex applications tailored to individual users unwieldy and difficult to manage.

Internationalization and localization considerations present unique challenges as the content and presentation of these websites and applications must be provided in several different languages and locales (i.e., local currencies, time-zones, holidays, and other regional customs). This not only requires modification of the content portion of the application but also the actual text displayed on buttons and other control portions of the application. In certain cases, logic within the website or application may also be modified to accommodate the specific language and locale requirements.

One conventional solution keeps several complete copies of an application for each of the different languages or locales. This requires a great deal of storage and poses difficulties where maintaining updates and changes to the application and interface. Another solution reduces the storage and maintenance issues by separating the localized text and images from the remainder of the application or website. This may reduce maintenance and storage requirements but instead impacts run-time performance of complex web-based applications when accessing and presenting information in the various language and locales.

DETAILED DESCRIPTION

Aspects of the present invention are advantageous in at least one or more of the following ways. Statistics on one or more users using an application are kept in a database to facilitate identifying patterns of accessing web pages and using an application. Implementations of the present invention use statistical information gathered on the user to assist in predicting the branch of web pages a user is likely to subsequently select. Further, the statistical information gathered can also be used to predict the behavior of an average group of users having a common trait or characteristics. Accordingly, the statistical information gathered can be combined and used to predict the behavior of many different individual users as well as groups of users in various contexts.

Branches of web pages are stored in cache based on the statistical information and likelihood that the user will access the same sequence or group of web pages in an application. Web page access and delivery is improved in part because a predicted branch of web pages is loaded into cache before the user actually makes the request for the branch of one or more web pages. Subsequent requests for web pages may also be improved as the predicted branch of one or more web pages stored in cache not only includes the initially requested web page but a series of web pages often accessed in succession.

Figure 1:
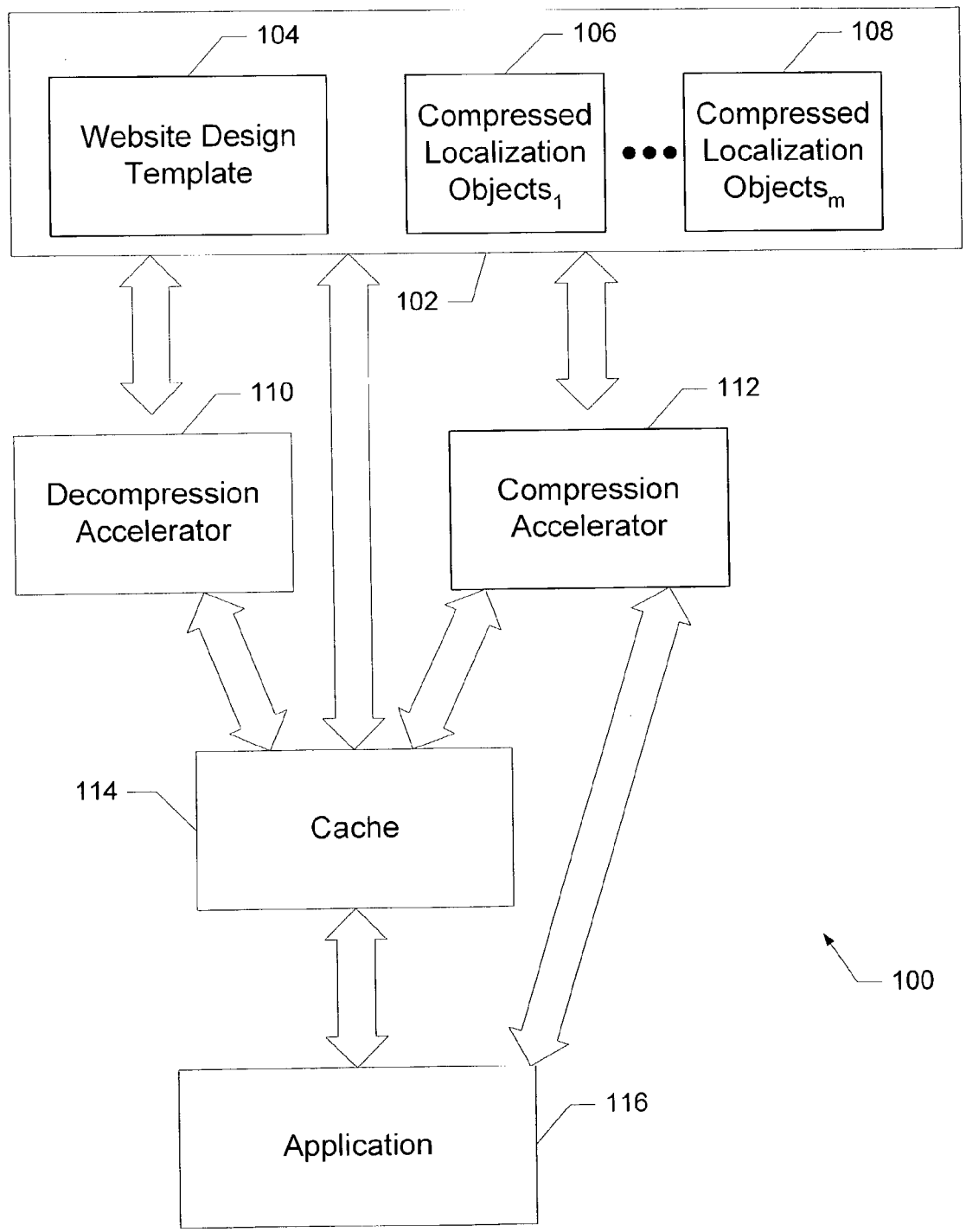
FIG. 1 is a block diagram illustrating the organization of components used by an application configured in accordance with one implementation of the present invention to improve efficiency of accessing web pages.

FIG. 1 is a block diagram illustrating the organization of components used by an application in accordance with one implementation of the present invention to improve efficiency of accessing web pages. Components 100 include web pages 102 having a website design template 104 with compressed localization objects$_l$ 106 through compressed localization objects$_m$ 108, decompression accelerator component 110, compression accelerator component 112, cache 114, and application 116.

To improve access, web pages 102 are further organized into website design template 104 and compressed localization objects$_l$ 106 through compressed localization objects$_m$ 108. Logic within website design template 104 corresponds to navigating branches of web pages and a website map. Implementations of the present invention improve performance of the application by predicting a branch of one or more web pages a user is likely to request.

A branch of web pages 102 is made available from website design template 104 by loading one or more compressed localization objects$_l$ 106 through compressed localization objects$_m$ 108 into cache 114 in accordance with one implementation of the present invention. Compressed localization objects$_l$ 106 through compressed localization objects$_m$ 108 tailor the language and other local custom (i.e., currency, time-zone, holidays, and other regional custom) within the application in accordance with U.S. Patent Application entitled, "Method and Apparatus for Localization of Applications" assigned to the assignee of the present invention by Jun Gu and John M. Kerr, filed on the same day therewith. The localization process described above compresses and decompresses localization objects to improve the performance of a localized application using web pages or other similar interfaces. For example, decompression accelerator 110 and compression accelerator 112 operate on compressed localization objects$_l$ 106 through compressed localization objects$_m$ 108, in part, to improve effective throughput and storage capacity for this information.

Figure 2:
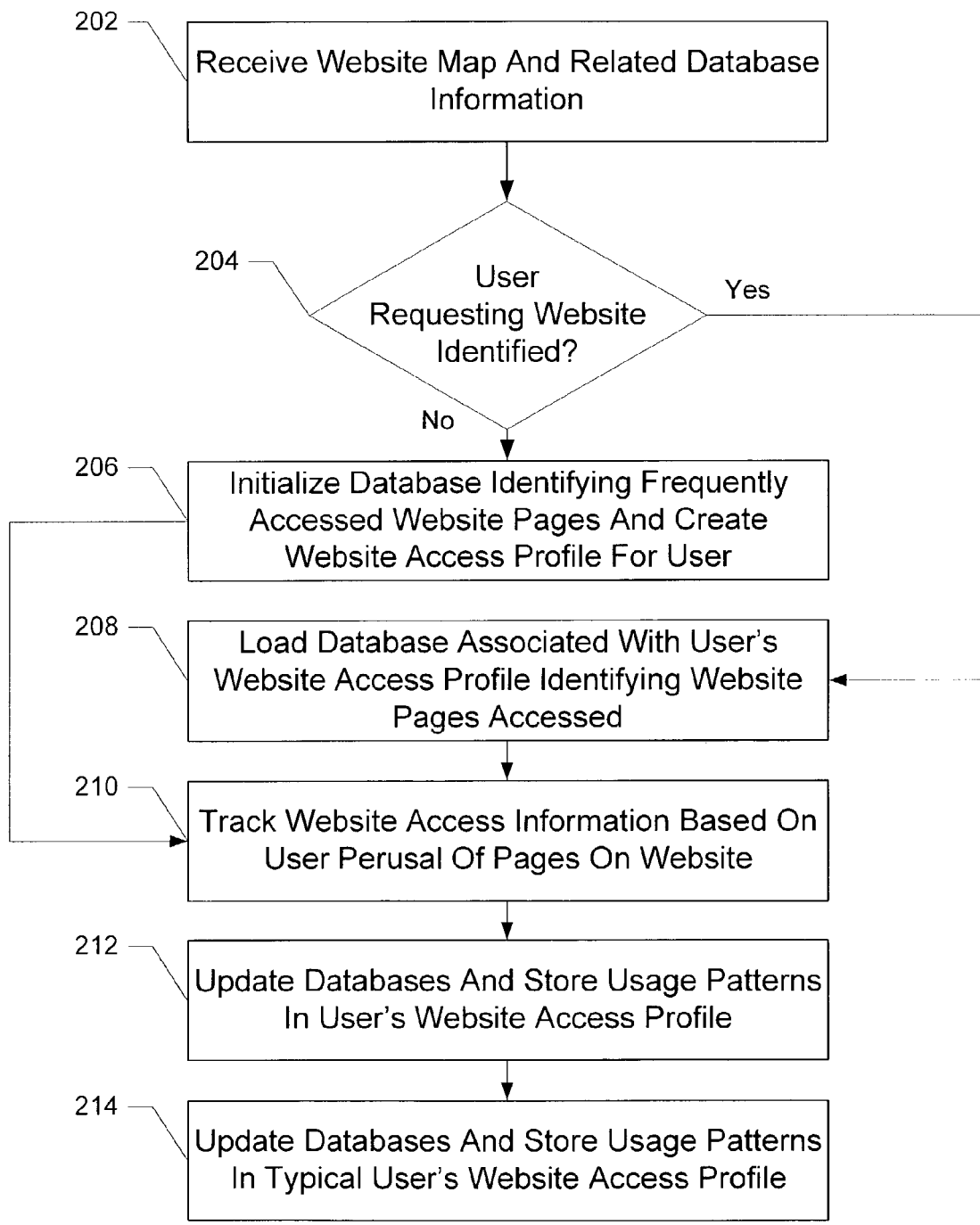
FIG. 2 is a flow chart diagram illustrating the operations used to identify and gather information on usage patterns in an application in accordance with one implementation of the present invention.

FIG. 2 is a flow chart diagram illustrating the operations used to identify and gather information on usage patterns in an application in accordance with one implementation of the present invention. An agent or other process running either in the background or foreground initially receives a website map and related database information describing the organization of an application, related web pages, and corresponding user, statistical, and database information (202).

The agent or process can be executed on a server or client depending on the organization of the application and the infrastructure of the computer systems running the application. Website information and usage patterns can be stored in one or more different types of databases used for storing information. In one implementation of the present invention, a directed graph facilitates efficiently representing and rapidly accessing the underlying website map and website portions and is described in further detail later herein.

These agents or other processes operate on the website map and related database information as a lower priority background process to minimize the performance impact on other processes running on a computer. For increased performance, agents or other processes operate at a higher priority relative to other processes running on the computer. In either implementation, processing the website map includes loading some or all portions of the website into a cache area. Additionally, the agent or processes also loads some or all of the database information identifying the user and their corresponding website access profile, if any. The web access profile includes statistical information related to a user's previous access to a given application. For example, a user's website access profile may be used to indicate whether a user has previously used a given application and the particular web pages in the application they have previously accessed. In addition, the website access profiles can also record details on the combinations and sequences the users have accessed the web pages associated with the application or a branch of the web pages.

The agent or other processes accessing the website information and databases attempts to identify the user requesting the application and associated website or web pages (204). In one implementation of the invention, an index associates users and their previously accessed applications to facilitate making this determination. If the user has not previously accessed the application, the agent or process creates a new website access profile for the user and initializes the database identifying applications and websites accessed by the user (206). Alternatively, if the agent or other processes identifies the user then databases identifying previously accessed applications, websites, or web pages are loaded corresponding to the user's website access profile (208). To reduce the amount of information loaded into cache, one implementation of the present invention only loads that portion of the database corresponding to the application requested by the user rather than all the application and database information associated with the user's website access profile.

Once the website access profile is created and/or loaded into memory, implementations of the present invention track the web pages associated with the application or website the user peruses (210). Tracking includes recording a variety of information useful in determining the user's behavior in the subsequent selection of applications and web pages. For example, implementations of the present invention track the applications as well as the pages within the application a user accesses. In addition to tracking specific pages, implementations of the present invention can also track the particular combinations and sequences of pages as the user peruses the various applications and web pages, a frequency each page is accessed by the user, and paths between pages accessed by the user.

After a given time interval, implementations of the present invention analyzes the tracked information, detects usage patterns, and updates the associated databases for a user (212). The tracked information is associated with a user and the user's corresponding database information describing the websites and applications they typically use. For example, this analysis may include identifying the user's access frequency to a specific application and web pages in the application during a user session. Further analysis, may identify the user's preferred paths executed to accomplish a task, typical branches selected provided one or more web pages in the application, and the overall likelihood of choosing a specific branch.

Combinations of the collected information can be used to predict actions taken by a specific user, a typical or average user, or users on one or more groups (e.g., a group of users having a system administrator role). Information gathered on a group of users is useful in predicting the behavior for individuals classified as belonging to the same group or groups for the data collected (214). Corresponding usage patterns and other information gathered from other users helps predict the applications, web pages, and branches of web pages a typical user will select. A separate database or database entry reserved for this typical or average user is updated with an aggregation of this information.

Figure 3:
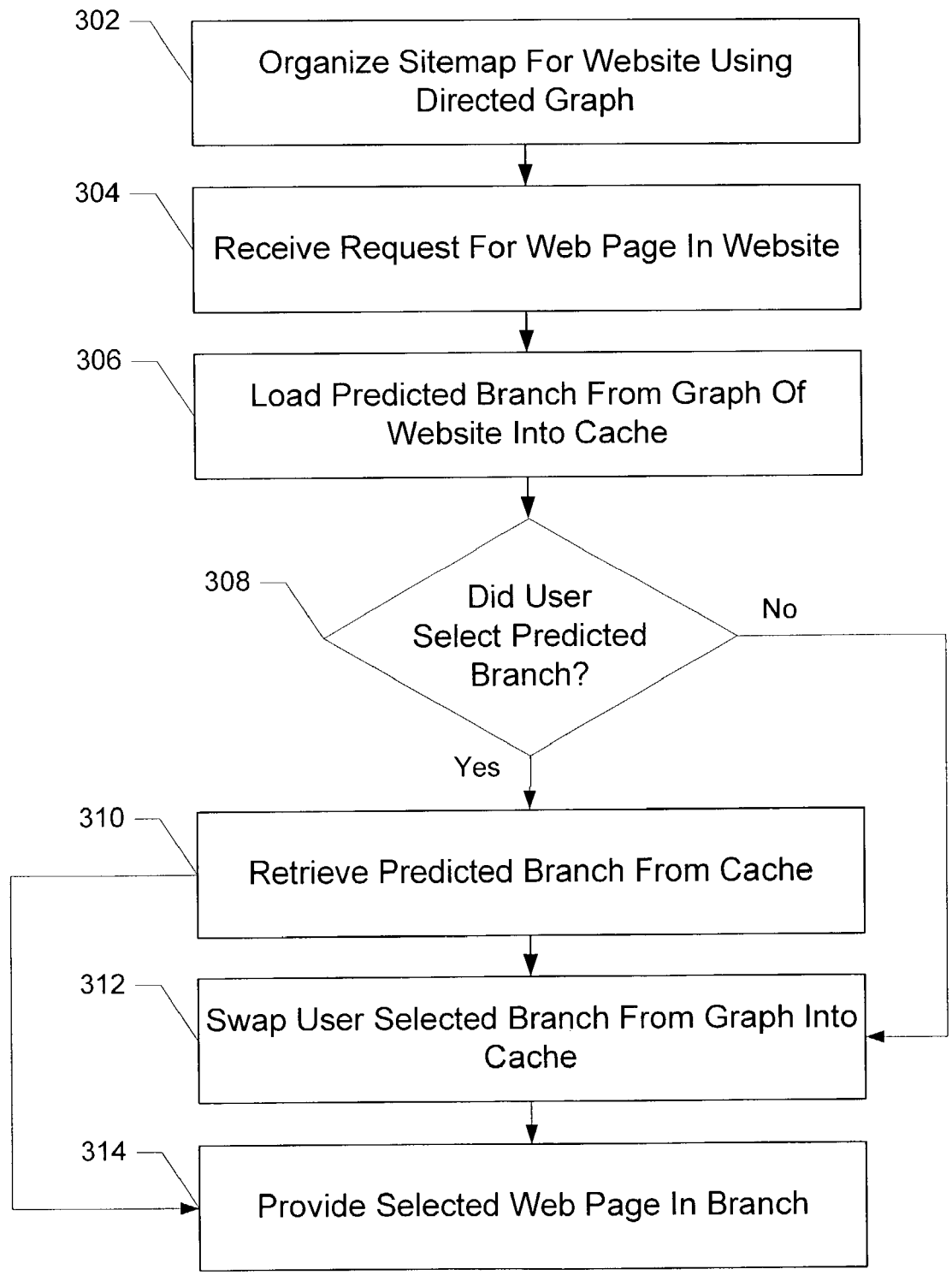
FIG. 3 is a flow chart diagram of the operations used for predicting the web pages or branch of web pages a user is likely to select in accordance with one implementation of the present invention.

FIG. 3 is a flow chart diagram of the operations used for predicting the web pages or branch of web pages a user will select in accordance with one implementation of the present invention. Historical access information collected on one or more users is used to predict the applications, websites, branches of the website, web pages that they are likely to select. One implementation of the present invention organizes a site map of the web pages in an application into a directed graph (302). In one implementation of the present invention, each node in the directed graph corresponds to a web page in an application. An edge between nodes in the directed graph representation of the application represents a viable path a user can make between web pages.

The agent or process of the present invention receives a request for a web page or portion of an application (304). The predicted branch from the graph of the website is loaded into cache (306). For each user, one implementation of the present invention assigns a metric value to each edge from a given starting node to several destination nodes indicating the likelihood that the user will select the destination node from the starting node. Metric values can be based upon the historical usage information collected about the user. For example, combining the metric values along these edges can be used to rank branches of web pages and the likelihood that one branch of web pages is more or less likely to be selected.

The agent or process compares the users actual request with the branches loaded into cache to determine whether the branch prediction was accurate (308). If a miss prediction is detected, different branches can be assembled and swapped into memory. If the branch stored in cache happens to contain the requested web page or pages, they are retrieved from the predicted branch portion already stored in cache (310). Alternatively, if the requested web page or pages is not in the cache portion then the correct branch or web pages are swapped with the incorrect branch or web pages stored in cache (312). Preferably, other subsequent requests for web pages and other information are also contained in the branch or web pages swapped into cache. In either case, the requested web page is retrieved and provided to the user making the request (314). Alternately, the requested web page not found in cache can be retrieved directly from secondary storage or other storage areas depending on the specific types of content or storage requirements.

Figure 4:
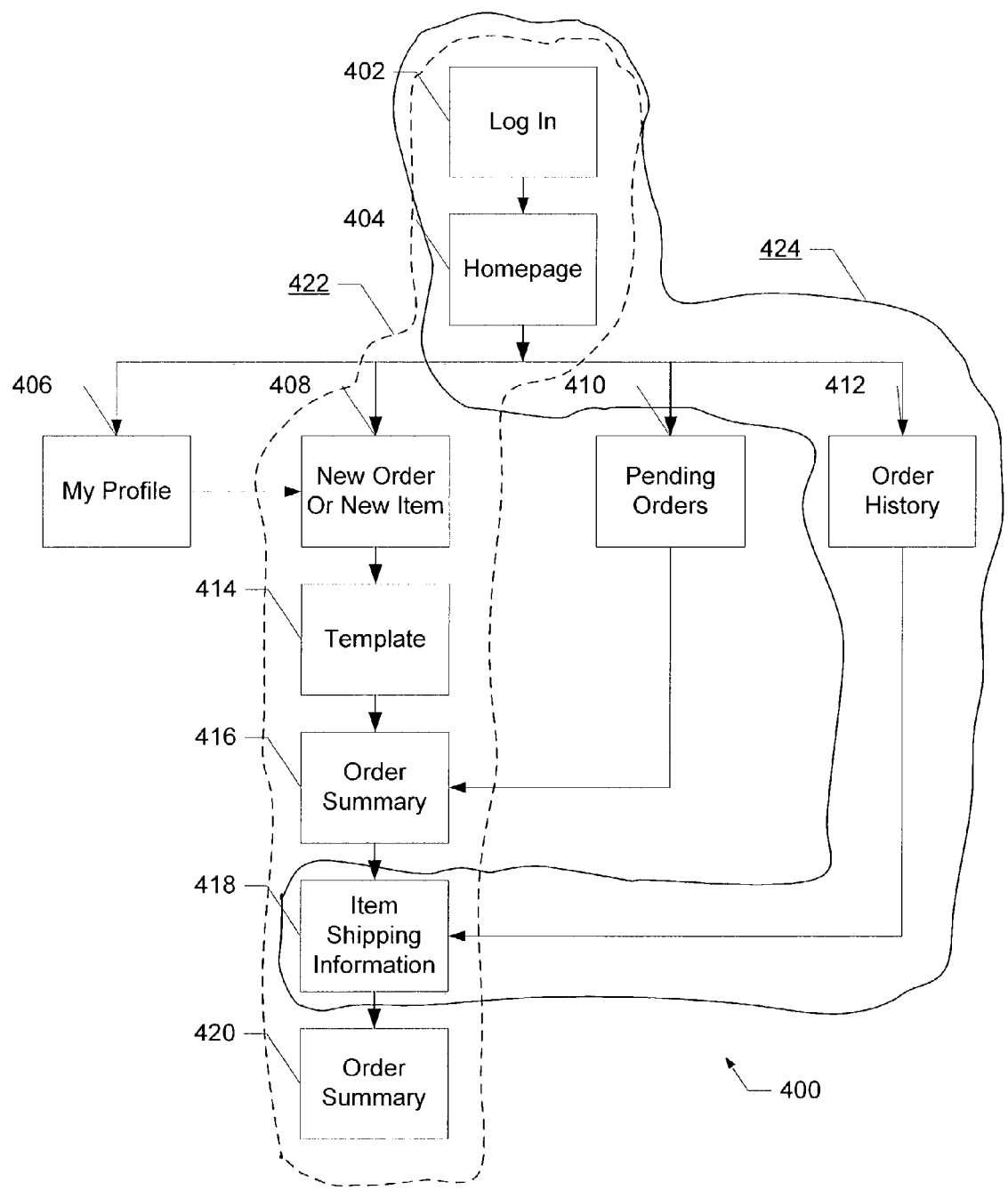
FIG. 4 is a block diagram depicting a sample website map and the effect of tracking branches of a website and storing them in cache in accordance with one implementation of the present invention.

FIG. 4 is a block diagram depicting a sample website map and the effect of tracking branch selections of a website and then predicting and loading one or more pages in cache in accordance with one implementation of the present invention. Website diagram 400 is used by an example application and includes web pages 402, 404, 406, 408, 410, 412, 414, 416, 418, and 420. Each web page in this diagram includes an identifier that identifies information about the web page relative to the application. For example, web page 402 includes a "Log in" identifier and is used by the user to login to the application while web page 418 includes an "Item Shipping Information" identifier because this latter identifier is used to access information about an item and its status in the shipping process.

The diagram in FIG. 4 also depicts a branch 422 circumscribed by dotted lines and a branch 424 circumscribed by a solid line. These branches represent web pages that a user typically uses in this particular sequence and/or combination. Alternatively, branches can be web pages grouped together that fulfill a particular operation or function. For example, a sequence of web pages can be gathered together because they are necessary or typically used to login to an application or order a product or service through the application over a network.

In operation, a user peruses or accesses one or more web pages represented by website diagram 400 while using an application. Implementations of the present invention track and record this information to facilitate predicting subsequent web pages accessed and used by the user. This tracking information is used to group together frequently accessed web pages during a particular interval into branches like branch 422 and branch 424. For example, the present invention associates branch 422 with a sequence of web pages 402, 404, 408, 414, 416, 418, and 420. An index listing web pages in branch 422 is identified and stored in a database entry associated with at least one user. When the user or users request web page 402 the one or more web pages associated with branch 422 are recalculated, composed, and loaded into cache.

Additional information can also be used to compare the likelihood of a user selecting items in one branch when compared with one or more other branches in a website diagram. For example, web pages associated with branch 424 are loaded into cache rather than web pages associated with branch 422 if the user or users more often select the sequence of web pages in branch 424. Accordingly, one implementation of the present invention would respond to a request for web page 402 by returning the "Login" web page 402 and then loading the remaining web pages in branch 424 into cache—in this example that would include web page 404, web page 412, and web page 418. This website with two branches loaded into cache is only one example and many other applications and websites with greater or fewer web pages and branches can also benefit from the various implementations of the present invention. Further, while the pages currently being viewed often facilitate prediction of subsequent pages, an alternate implementation of the present invention may look at previously selected pages in the activity history of the current user session to gain a better understanding of the user's current task.

Figure 5:
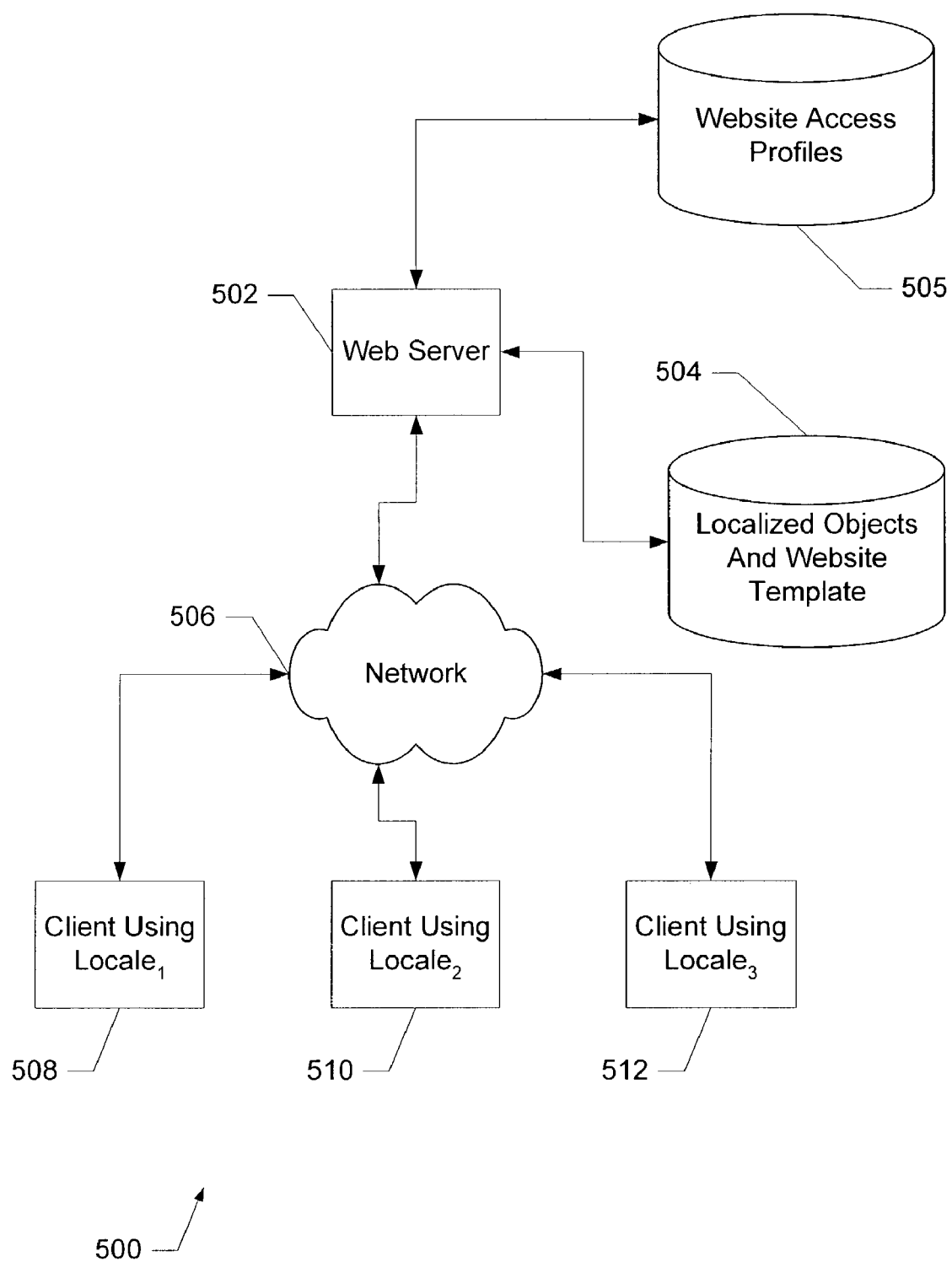
FIG. 5 is a block diagram depicting an application provided in multiple locales over a network using one implementation of the present invention.

FIG. 5 is a block diagram depicting an application provided in multiple locales over a network 500 using one implementation of the present invention. Network 500 includes a web server 502, a localized object database 504, website access profiles 505, a network 506, a client using $locale_1$ 508, a client using $locale_2$ 510, and a client using $locale_3$ 512.

Implementations of the present invention store historical tracking information on web pages and applications a user accesses in web access profiles 505. These web access profiles 505 are used by web server 502 to make branch predictions and cache one or more web pages from an application as previously described. Objects in localized object database 504 include portions of the application and website in one or more different languages. Depending on the locale selected by the user, different objects are combined with the application and delivered to user fulfilling their request for a web page or pages as requested in their locale and/or language.

For example, web server 502 identifies a web access profile for a user in web access profiles 505 to predict one or more branches of the website to process and load into cache. Locale information in the localized object database 504 is combined with the predicted branch to deliver the web pages in the application in the proper locale or language. In this example, client using $locale_1$ 508, client using $locale_2$ 510, and client using $locale_3$ 512 can each receive versions of an application or web pages tailored to their selected language or locale. Further, implementations of the present invention pre-calculate and cache the branch most likely selected by the user. This operation improves the performance of delivering the web pages and applications without storing multiple copies of the application or web pages.

Figure 6:
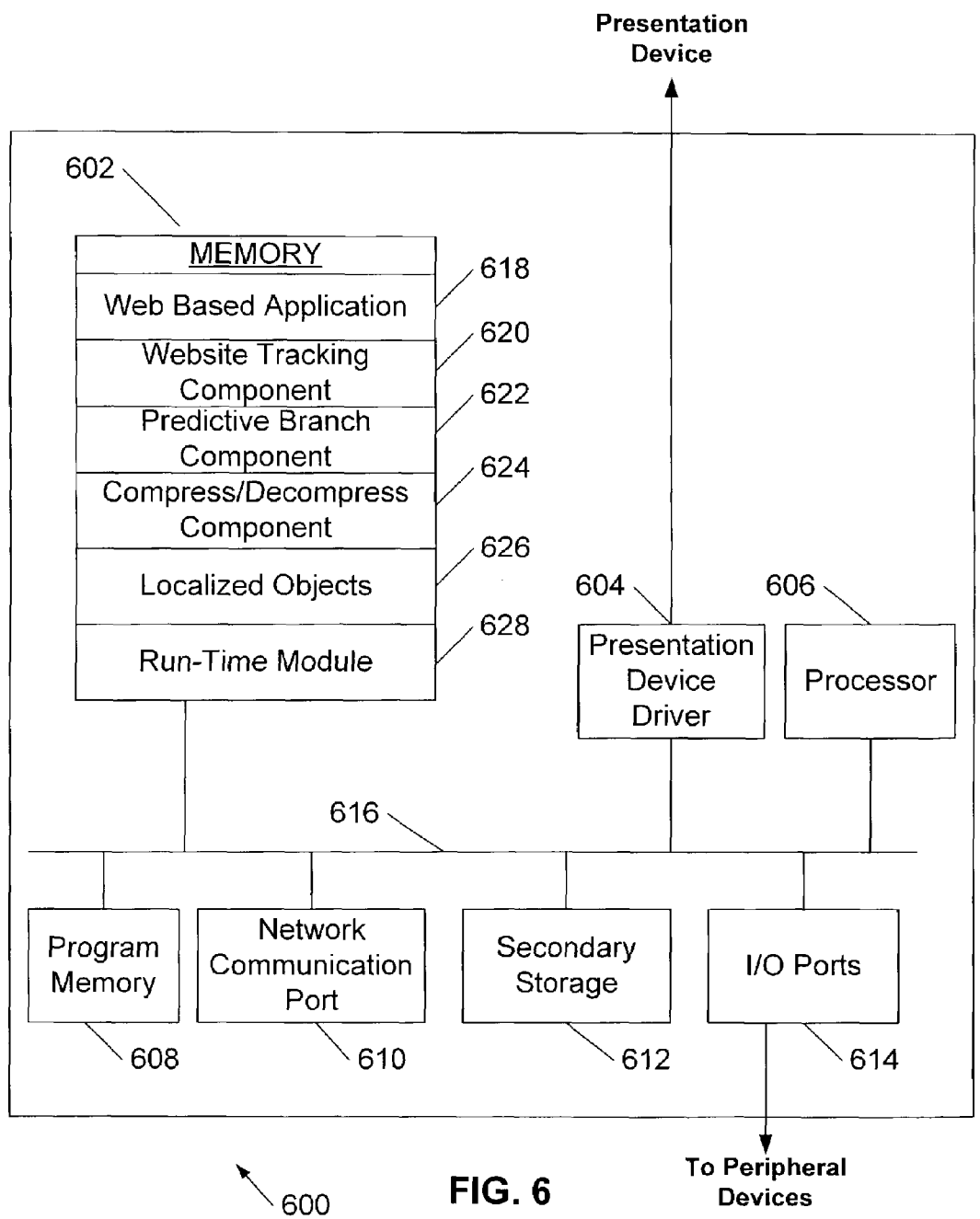
FIG. 6 is a block diagram of a system used by one implementation of the present invention for efficient delivery of web pages and applications.

FIG. 6 is a block diagram of a system used by one implementation of the present invention for efficient delivery of web pages and applications. In this example system 600 includes a memory 602, typically random access memory (RAM), a presentation device driver 604, a processor 606, a program memory 608 (for example, a writable read-only memory (ROM) such as a flash ROM), a network communication port 610, a secondary storage 612, audio and I/O ports 614 operatively coupled together over bus 616. System 600 can be preprogrammed, in ROM, for example, or it can be programmed (and reprogrammed) by loading a program from another source (for example, from a floppy disk, a CD-ROM, or another computer).

Memory 602 includes a web based application 618, a website tracking component 620, a predictive branch component 622, a compress/decompress component 624, localized objects 626, and a run-time module 628. Web based application 618 is an application that delivers a user interface over a network like the Internet or an intranet. This application can use programming constructs based on HTML (hypertext markup language), XML (extensible markup language), or other standards as well as proprietary programming languages for delivering web pages or portions of the application over a network. Some or all of web based application 618 can be executed on system 600 operating as either a client system or a server system.

Website tracking component 620 collects information on one or more users as they peruse web pages and applications. This information is stored in web access profiles associated with each user in a database. Predictive branch component 622 uses the information stored in the web access profiles associated with each user to determine the branches of a website or web pages to load into cache. Different branches of the website or web pages are loaded into cache depending on the user and the historical access information for the particular user. As previously discussed, predictive branch component 622 may use average values instead of a specific web access profile when a user does not have a specific web access profile to reference in the prediction operation.

Further efficiencies are obtained by using compress/decompress component 624 to reduce the size of web pages, branches with one or more web pages, and localized object information. The decompress portion of compress/decompress component 624 is used to compact/enlarge portions of the web pages, branches of the one or more web pages, localized objects 626, and other portions of the application as needed. As previously described, localized objects 626 provide information used to tailor the web pages, branches of web pages, and application to a specific language or locale as required by each user.

To facilitate performing these operations on computer system, run-time module 628 allocates resources from memory, storage area, and processor time-slices to these and other operations. For example, run-time module 628 can be based on a real-time kernel of an operating system or can be pre-emptive operating system having fewer real-time operating characteristics.

Presentation device driver 604 provides digital and/or analog signal output to an image generation device such as a display or a printer. The image generation device can be local or remotely located over a network. In one implementation, web pages, branches of web pages, and some or all of the applications are carried by the digital and/or analog signal output in accordance with implementations of the present invention.

Secondary storage 612 is suitable for storing executable computer programs, including programs embodying the present invention, and data including buffers and temporary storage space as need to implement aspects of the present invention. For example, databases with additional localized objects, web access profiles, and other information used by one or more implementations of the present invention can be stored in secondary storage 612.

Input/output (I/O) ports 614 are coupled to system 600 over bus 616. Peripheral devices connected through I/O ports 614 may include audio ports generating analog and/or digital signals amplified for listening over an audio generation device like a speaker. Input/output ports facilitate the receipt and transmission of data (e.g., text, images, videos, and animations) in analog or digital form over communication links such as a serial link, local area network, wireless link, and parallel link. These input/output (I/O) 614 ports also facilitate communication with a wide variety of peripheral devices including keyboards, pointing devices (mouse, touchpad and touchscreen) and printers. Alternatively, separate connections (separate buses) can be used to interface with these peripheral devices using a combination of Small Computer Systems Interface (SCSI), Universal Serial Bus (USB), IEEE 1394/Firewire, Personal Computer Memory Card International Association (PCMCIA) or any other protocol suitable for interfacing with the peripheral device being attached to system 600.

Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

While specific embodiments have been described herein for purposes of illustration, various modifications may be made without departing from the spirit and scope of the invention. For example, various implementations are described as including web pages or websites however alternate implementation can be applications that do not rely upon technology that web pages or websites use to deliver information or operate. Accordingly, the invention is not limited to the above-described implementations, but instead is defined by the appended claims in light of their full scope of equivalents.

What is claimed is:

1. A method of predicting the selection of web pages in a website, comprising:

organizing a sitemap of the website that ranks the web pages in the website available in one or more different locales according to a historical usage pattern for a user and to predict a selected locale from the one or more different locales and the corresponding language and other locale preferences for the user in accordance with the historical usage pattern;

loading a predicted branch of the web pages from the one or more different locales into a cache selected according to the ranking of the web pages and their inclusion within the selected locale as predicted;

receiving a request for a web page from the website and associated with the selected locale for the user; and providing the requested web page from the website when the request for the web page is at least one of the cached web pages in the predicted branch and associated with the selected locale predicted from the one or more different locales available in the website.

2. The method of claim 1 wherein loading the predicted branch further comprises:

determining a metric for each of the one or more branches in the sitemap using the ranking of the web pages and the selected locale;

comparing the metrics associated with each of the one or more branches in combination with the selected locale; and selecting the predicted branch based on the comparison of the metrics associated with each of the one or more branches and the selected locale.

3. The method of claim 2 wherein a metric is computed by summing the weighted values of the web pages associated with a branch.

4. The method of claim 1 wherein organizing the sitemap further comprises:

retrieving a usage pattern associated with a user from a usage pattern database; and associating values with individual web pages in the sitemap according to the usage pattern for the user and the selected locale.

5. The method of claim 1 further comprising:

swapping the predicted branch in the cache with the branch containing the requested web page when the requested web page was not in the predicted branch of the website; and retrieving the requested web page from the branch containing the requested web page swapped into the cache.

6. A system for improved access to web pages in an application, comprising:

a web access profile database indicating a frequency that a user selects web pages in the application and a prediction of a selected locale for the user in accordance with the frequency wherein the selected locale has a corresponding language and other locale preferences; and a web server having a sitemap of the web pages associated with the application identifying branches of web pages in the sitemap available in one or more different locales and ranked according to the selected locale combined with the web access profile database information wherein the ranking determines the branch of web pages the web server loads into cache.

7. The system of claim 6 wherein at least one entry in the web access profile database is the selected locale predicted for the user and another entry is a compilation of the usage patterns from other entries in the web access profile database representing the access pattern of web pages for a typical user of the application.

8. The system of claim 7 wherein the compilation is a weighted average of the frequencies users access the web pages in the application provided the selected locale.

9. The system of claim 6 further comprising:

a client requesting web pages over a network from the web server associated with the application.

10. The system of claim 6 wherein the web server is integrated into the application.

11. The system of claim 6 wherein a branch is determined by gathering web pages together corresponding to an operation on the website.

12. The system of claim 6 wherein determining a branch, further comprises:

combining web pages together from the selected locale having at least one web page previously accessed by a user in a sequence.

13. A method of identifying usage patterns for web pages in a website, comprising:

receiving a website map identifying the organization of one or more web pages in the website and available in one or more different locales;

tracking one or more web pages accessed by a user during a session and the underlying branch of the one or more web pages to predict a selected locale from the one or more different locales and the corresponding language and other locale preferences to load into the website;

determining a branch of one or more web pages in the selected locale from the one or more different locales in the website accessible by a user and organized according to the website map; and updating a database that associates the branch and the selected locale in the corresponding language and other locale preferences with the user of the website and indicates usage of the locale specific branch and the one or more web pages accessed by the user.

14. The method of claim 13 further comprising determining one or more possible branches of one or more web pages in the selected locale accessible by the user corresponding to the site map.

15. The method of claim 13 wherein the website map is organized into a directed graph.

16. The method of claim 13 wherein the receiving is performed within an application that processes web pages and communicates results with a server.

17. The method of claim 13 wherein the receiving is performed on a server that processes the web pages and communicates with an application.

18. The method of claim 13 wherein the tracking comprises:

identifying a user when the web pages are accessed; and gathering at least one or more of the following set of characteristics: a frequency each page is accessed by the user, a sequence of web pages processed by the user, the selected locale associated with the one or more web pages and the user and identifying paths between web pages accessed by the user.

19. The method of claim 13 wherein the step of determining a branch, further comprises:

gathering web pages together from the selected locale corresponding to an operation on the website.

20. The method of claim 13 wherein the step of determining a branch, further comprises:

combining web pages together from the selected locale and previously accessed by a user in a sequence.

21. An apparatus for accessing web pages, comprising:

a processor that executes instructions to access the web pages;

a memory having an application that receives requests for one or more web pages available in one or more different locales, a profiler component that tracks user access to one or more web pages to predict a selected locale from the one or more different locales and the corresponding language and other locale preferences to load into the website and stores the information in a web access profile database, and a predictive branch component that selects a branch having one or more web pages in the selected locale according to the web access profile database and loads the web pages into cache.

22. The apparatus of claim 21 further comprising:

a network communication pod that transmits the web pages in response to the requests.

23. The apparatus of claim 21 further comprising:

a presentation device driver that presents the requested one or more web pages on a presentation device.

24. A computer program product, tangibly stored on a computer readable medium, comprising instructions operable to cause a programmable processor to:
  receive a website map for a website identifying the organization of one or more web pages in the website available in one or more different locales;
  determine a branch of one or more web pages in the website accessible by a user and organized according to the website map and a selected locale for the user, further comprising instructions that,
  track one or more web pages and the underlying branch to predict the selected locale from the one or more different locales and the corresponding language and other preferences to load into the website, accessed by a user during a session; and
  update a database that associates one or more branches in the selected locale in the corresponding language and other locale preferences with the user of the website and indicates usage of the locale specific one or more branches in the selected locale and the one or more web pages accessed by the user.

25. A computer program product, tangibly stored on a computer readable medium, comprising instructions operable to cause a programmable processor to:
  organize a sitemap of web pages in a website that ranks the web pages in the website available in one or more different locales according to a historical usage pattern for a user and to predict a selected locale from the one or more different locales and the corresponding language and other locale preferences for the user in accordance with the historical usage pattern;
  load a predicted branch of the web pages from the one or more different locales into a cache selected according to the ranking of the web pages and the selected locale as predicted for the user;
  receive a request for a web page from the website; and
  provide the requested web page from the website when the request for the web page is at least one of the cached web pages in the predicted branch and the selected locale predicted from the one or more different locales available in the website for the user.

26. An apparatus for identifying usage patterns for web pages in a website, comprising
  means for receiving a website map identifying the organization of one or more web pages in the website available in one or more different locales;
  means for tracking one or more web pages accessed by a user during a session and the underlying branch of the one or more web pages to predict a selected locale from the one or more different locales and the corresponding language and other locale preferences to load into the website;
  means for determining a branch of one or more web pages in the selected locale from the one or more different locales in the website accessible by a user and organized according to the website map; and
  means for updating a database that associates the branch and the selected locale in the corresponding language and other locale preferences with the user of the website and indicates usage of the locale specific branch and the one or more web pages accessed by the user.

* * * * *

UNITED STATES PATENT AND TRADEMARK OFFICE
CERTIFICATE OF CORRECTION

PATENT NO. : 7,548,982 B2 Page 1 of 1
APPLICATION NO. : 10/285231
DATED : June 16, 2009
INVENTOR(S) : Jun Gu et al.

It is certified that error appears in the above-identified patent and that said Letters Patent is hereby corrected as shown below:

In column 6, line 27, before "508" delete "locale," and insert -- $locale_1$ --, therefor.

In column 10, line 63, in Claim 22, delete "pod" and insert -- port --, therefor.

Signed and Sealed this

Third Day of August, 2010

David J. Kappos
*Director of the United States Patent and Trademark Office*